Aug. 22, 1961  K. JASSNIKER  2,996,996
RADIAL DIFFUSER FOR A RADIAL TURBOMACHINE
Filed Jan. 13, 1959
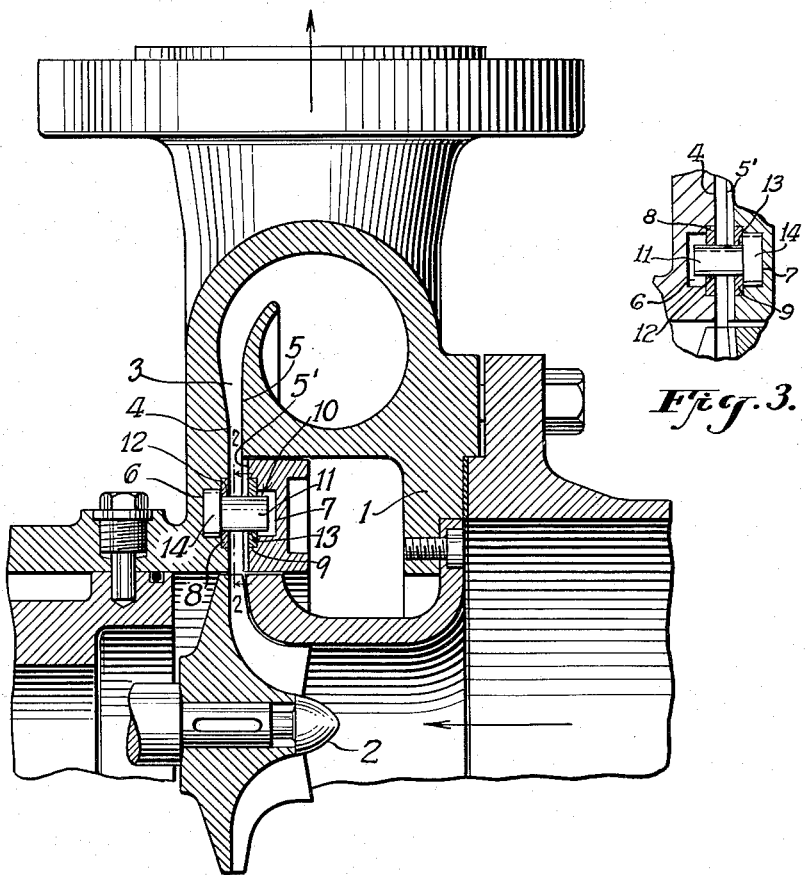
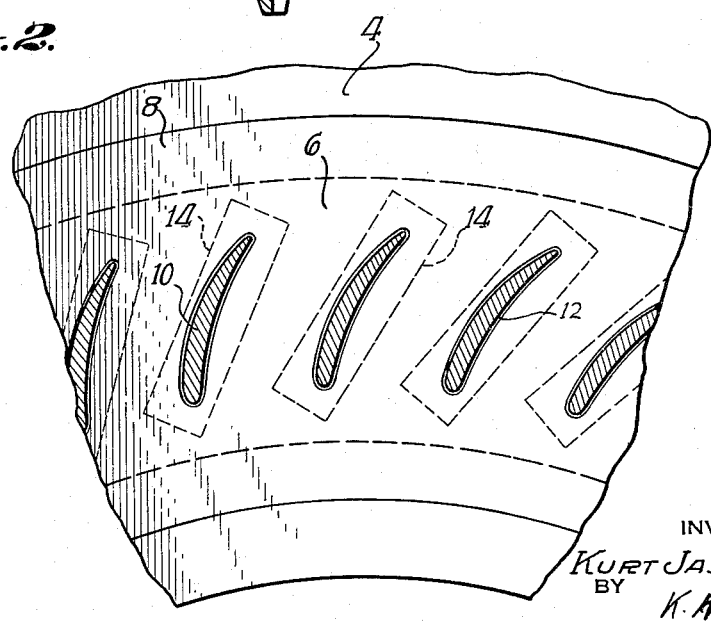
INVENTOR
KURT JASSNIKER.
BY
K. A. Mayr
ATTORNEY United States Patent Office 2,996,996
Patented Aug. 22, 1961

2,996,996
RADIAL DIFFUSER FOR A RADIAL TURBOMACHINE
Kurt Jassniker, Winterthur, Switzerland, assignor to Sulzer Freres S.A., Winterthur, Switzerland, a corporation of Switzerland
Filed Jan. 13, 1959, Ser. No. 786,641
Claims priority, application Switzerland Jan. 20, 1958
5 Claims. (Cl. 103—97)

The present invention relates to a turbomachine having a rotor and a diffuser having opposed radial walls whose axial spacing can be changed, each wall having an annular groove coaxial of the rotation axis of the rotor, a guide vane ring being mounted in one of said grooves the guide vanes axially movably extending through suitably shaped aperatures in a cover of the annular groove in the opposite wall.

Turbomachines of this type are known which are provided with a guide vane ring having an annular base element which may be split in one or more diametrical planes and to which the guide vanes are rigidly connected. A guide vane ring of this kind may be manufactured by precision casting or the guide vanes may individually be rigidly connected to the base element, for example, by means of welding. These manufacturing processes are very expensive. The cost of making suitable molds for precision casting is very high. Finishing of precision-cast or welded guide vane rings is also very costly. The cover member of the groove into which the guide vanes extend must have apertures which conform individually with the cross section of the guide vanes which extend through the apertures. Manufacture of this cover to fit a precision-cast or a welded guide ring including an annular base element and guide vanes rigidly connected thereto is also very costly.

It is an object of the present invention to provide a guide vane arrangement for a diffuser of a turbomachine whose flow area can be changed whereby the guide vanes and annular members for retaining the vanes in one of the diffuser walls and for guiding the vanes in the opposite diffuser wall can be accurately mass produced at a low cost. In the arrangement according to the invention the guide vanes are provided with feet or root portions which are placed in an annular groove in one of the diffuser walls and retained in the groove by an annular member covering the groove and having apertures through which the guide vanes extend.

With the arrangement according to the invention a plurality of like guide vane or blade elements, each element having a vane portion and a foot or root, can be mass produced at low cost, for example, by drop forging, precision casting or sintering. Placing the root portions of the guide vanes in the respective groove and retaining the vanes in the groove by an annular cover member provided with suitable apertures is extremely simple. To make the apertures for receiving the guide blades in the two annular cover members covering the grooves in opposed walls of the diffuser is also not difficult. The cover members are relatively thin and can be pressed together in coaxial position whereupon the apertures or slots for the guide vanes may be made in the cover members, for example, by electric spark erosion. An advantage of the present invention resides in the fact that the guide vane ring arrangement can be made of ceramic material.

The novel features which are considered characteristic of the invention are set forth with particularity in the appended claims. The invention itself, however, and additional objects and advantages thereof will best be understood from the following description of an embodiment thereof when read in connection with the accompanying drawing in which:

FIG. 1 is an axial sectional view of a portion of a turbomachine according to the invention.

FIG. 2 is a large scale sectional view of a detail of the machine shown in FIG. 1, the section being made along line 2—2 in FIG. 1.

FIG. 3 is an axial sectional view of a modified detail of the turbomachine shown in FIG. 1.

Referring more particularly to the drawing, numeral 2 designates a rotor around which a casing 1 including a diffuser 3 is arranged. The latter has parallel radial walls 4 and 5. The axial spacing of at least a portion of the walls can be changed. For this purpose the wall 5 has an annular portion 5' which is coaxial of the rotor 2 and axially movable in the casing 1. No means are shown for effecting the axial movement because these means do not form part of the present invention. Means may be used as shown in my copending application Serial No. 776,530, filed November 26, 1958. The wall 4 is provided with an annular groove 6 which is opposite an annular groove 7 in the wall portion 5'. Both grooves are coaxial of the rotation axis of the rotor 2. The grooves 6 and 7 are covered by annular cover members 8 and 9, respectively, whose outside surface is flush with the respective diffuser wall. Guide vane or blade elements 10 have feet or roots 14 which are placed in the groove 6 and retained therein by the cover member 8 which is provided with apertures or slots 12 through which the vane portions 11 of the elements 10 extend. These vane portions also extend through suitable apertures or slots 13 in the ring 9 and are axially movable therein. Depending on the axial spacing of the wall 4 and the annular portion 5', the vane portions 11 extend more or less into the groove 7.

The root portions 14 of the blade elements 10 may either be placed in the groove 6 of wall 4 or in the groove 7 of the axially movable ring 5'. This is illustrated in FIG. 3.

I claim:

1. In a turbomachine having a rotor, a radial diffuser surrounding said rotor for receiving operating medium therefrom, said radial diffuser including two opposed, parallel, radial and axially spaced walls, one of said walls having an axially movable substantially annular portion which is coaxial of said rotor, an annular groove in said axially movable wall portion, an annular groove in the wall which is opposite the wall having an axially movable portion, said two annular grooves being placed coaxially of the rotation axis of said rotor and having substantially the same diameters, an annular cover member for each of said grooves, a plurality of apertures in each of said cover members, the apertures in one cover member being individually opposed to the apertures in the other cover member, and a plurality of guide vanes individually extending through opposed apertures in said cover members, said guide vanes having foot portions of a greater cross section than the cross section of the respective guide vane, said foot portions being placed in one of said grooves inside the respective cover member to be retained by the latter in the respective diffuser wall.

2. In a turbomachine as defined in claim 1 and wherein said foot portions are placed in the groove in the wall which is opposite the wall having an axially movable portion.

3. In a turbomachine as defined in claim 1 and wherein said cover members are exactly alike.

4. In a turbomachine having a rotor, a radial diffuser surrounding said rotor for receiving operating medium therefrom, said radial diffuser including two opposed, parallel, radial and axially spaced walls, one of said walls having an axially movable substantially annular portion which is coaxial of said rotor, an annular groove in said axially movable wall portion, an annular groove in the wall which is opposite the wall having an axially movable portion, said two annular grooves being placed coaxially of the rotation axis of said rotor and having substantially the same diameters, an annular cover member for each of said grooves, a plurality of apertures in each of said cover members, the apertures in one cover member being individually opposed to the apertures in the other cover member, and a plurality of guide vanes individually having a root portion and a vane portion extending from said root portion, the configuration of said apertures being substantially like the cross section of said vane portions and the latter individually extending through opposed apertures in said cover members, said root portions being placed in one of said grooves inside the respective cover member to be retained by the latter in the respective diffuser wall.

5. In a turbomachine having a rotor, a radial diffuser surrounding said rotor for receiving operating medium therefrom, said radial diffuser including two opposed, parallel, radial and axially spaced walls, one of said walls having an axially movable substantially annular portion which is coaxial of said rotor, an annular groove in said axially movable wall portion, an annular groove in the wall which is opposite the wall having an axially movable portion, said two annular grooves being placed coaxially of the rotation axis of said rotor and having substantially the same diameters, an annular cover member for each of said grooves, a plurality of apertures in each of said cover members, the apertures in one cover member being individually opposed to the apertures in the other cover member, and a plurality of guide vanes individually having vane portions individually extending through opposed apertures in said cover members, said opposed apertures being shaped substantially like the cross section of the vane portions extending therethrough, said guide vanes having foot portions placed in one of said grooves inside the respective cover member to be retained by the latter in the respective diffuser wall.

References Cited in the file of this patent

UNITED STATES PATENTS

| | | |
|---|---|---|
| 2,724,544 | Hardigg | Nov. 22, 1955 |
| 2,739,782 | White | Mar. 27, 1956 |
| 2,801,790 | Doll | Aug. 6, 1957 |
| 2,846,185 | Widmer | Aug. 5, 1958 |

FOREIGN PATENTS

| | | |
|---|---|---|
| 572,859 | Great Britain | Oct. 26, 1945 |
| 660,383 | Great Britain | Nov. 7, 1951 |
| 753,316 | Great Britain | July 25, 1956 |